(12) United States Patent
Kaye

(10) Patent No.: US 9,039,338 B2
(45) Date of Patent: May 26, 2015

(54) VERY HIGH STRENGTH SWIVEL ANCHOR

(75) Inventor: Gordon E. Kaye, Glens Falls, NY (US)

(73) Assignee: Mechanical Plastics Corp., Norwalk, CT (US)

( * ) Notice: Subject to any disclaimer, the term of this patent is extended or adjusted under 35 U.S.C. 154(b) by 250 days.

(21) Appl. No.: 12/859,857

(22) Filed: Aug. 20, 2010

(65) Prior Publication Data

US 2012/0045292 A1 Feb. 23, 2012

(51) Int. Cl.
*F16B 37/08* (2006.01)
*F16B 13/08* (2006.01)

(52) U.S. Cl.
CPC ....... *F16B 13/0808* (2013.01); *Y10T 29/49948* (2015.01)

(58) Field of Classification Search
USPC .................................. 411/340, 344–346, 349
See application file for complete search history.

(56) References Cited

U.S. PATENT DOCUMENTS

| | | | | |
|---|---|---|---|---|
| 23,551 | A | * | 4/1859 | Clayton ............................ 24/98 |
| 1,878,579 | A | | 9/1932 | Gober |
| 1,915,509 | A | * | 6/1933 | Adam ...................... 292/256.73 |
| 2,144,895 | A | | 1/1939 | Place |
| 2,945,705 | A | * | 7/1960 | Murray ............................ 285/18 |
| 2,979,797 | A | * | 4/1961 | Murphy ........................ 411/458 |
| 4,100,833 | A | * | 7/1978 | Nessa ............................ 411/340 |
| 4,439,079 | A | | 3/1984 | Losada |
| 4,453,869 | A | * | 6/1984 | Cremieux ....................... 411/38 |
| 4,650,386 | A | | 3/1987 | McSherry |
| 5,044,854 | A | * | 9/1991 | Oh ................................ 411/344 |
| 5,110,243 | A | * | 5/1992 | Oh ................................ 411/344 |
| 5,147,166 | A | | 9/1992 | Harker |

FOREIGN PATENT DOCUMENTS

WO PCT/US2011/048334   1/2012

* cited by examiner

*Primary Examiner* — Flemming Saether
(74) *Attorney, Agent, or Firm* — Israel Nissenbaum; Yitzy Nissenbaum

(57) ABSTRACT

A method and an anchor for supporting items on a substrate such as drywall. The anchor comprises a structure configured to carry the anchoring element in a minimal cross section configuration through an insertion hole and to effect a first expansion. The anchor further comprises an adjustable cap member configured to be moved to fixedly position the anchoring element to the non-accessible side of the substrate. The anchoring element comprises a base channel member, a top channel member, and a connector-pivoting element configured to pivotally connect the top channel member to the base channel member. The top channel member is configured to be nested with the base channel member in the minimal cross section configuration and to be pivotally rotatable via the connector pivoting element in the plane parallel to the non-accessible side of the wall, with the pivotal rotation of the top channel member providing the second expansion.

17 Claims, 5 Drawing Sheets

VERY HIGH STRENGTH SWIVEL ANCHOR

FIELD OF THE INVENTION

This invention relates to high-strength anchors and particularly to anchors suitable for supporting hospital railings and grab bars, cabinets, bookcases, large screen televisions and other heavy items, directly on walls or substrates and particularly walls comprised of drywall or on boats with fiberglass or sheet metal substrates.

BACKGROUND OF THE INVENTION

Drywall, comprised of compressed powdered gypsum contained between sheets of thick paper or cardboard, is one of the most common interior-wall construction materials, particularly in the United States. It is easily handled, readily installed and provides an excellent base for paint. It is available in standard 4'×8' sheets with common thicknesses of ½" and ⅝". It is however, a relatively poor material as a base support for supporting items, particularly heavy items, since it has little structural strength and tends to crumble when disrupted. In order to increase supporting strength, sheets of drywall are often doubled, such as in standard hospital wall construction. Nevertheless, drywall, even with double thickness, remains a relatively poor support when compared to masonry, metal, wood or other construction materials.

The common structure of an interior wall constructed of drywall comprises a series of wooden or metal framing studs, generally of nominal cross section 2" by 4" dimensions, laterally spaced 16" apart and attached to an outer wall. A hollow is formed directly behind the drywall, of 3.75" actual depth, between the drywall and the outer wall, into which insulation is placed and electrical, plumbing, heating and other lines are drawn and concealed. While it is preferred to attach heavy objects directly to the framing studs, it is not always logistically possible, since most of the wall space is unsupported drywall.

Many types of objects are commonly hung on and are supported directly on walls. These items range from those which are decorative and static, such as pictures and minors (which can be light or heavy depending on the size and nature of the picture or minor), to heavy static items such as big screen televisions. Static items are not moved nor is the load on the wall changed. There are, however, numerous non-static items which, in addition to their usual heavy weight, also subject supporting walls and structures to moving stresses as well. Examples of non-static items include televisions on swivel supports, bookshelves, kitchen cabinets and hand railings or grab bars, in particular those used in hospitals. Support offered by drywall structures is problematic especially in applications where support, directly on the framing studs, is not possible or feasible.

In response to the need for reliable fastening and support of items on construction drywall, numerous fastening expedients or anchors have been developed. These fasteners and anchors fall within various categories based on load to be supported. For very light loads, there are adhesive hooks, expansion plugs, nail-in hooks and self-drilling anchors with oversize screw threads, which are supported directly on the surface or within the thickness of the drywall. A class of anchors with greater holding strength is hollow wall expansion anchors, which are inserted within a usually pre-drilled hole and which are expanded behind the wall. These hollow wall anchors include the familiar toggle bolt having spring hinged "toggles" that fold for insertion with an inserted bolt and spring open behind a wall. Another common anchor is the molly bolt anchor which is tubular for insertion into the pre-drilled hole and which is expanded by an inserted bolt that engages and pulls the front of the anchor toward the wall while "expanding" side legs outwardly into contact with the wall. Various plastic expansion anchors such as the TOGGLER® over-center anchor, from Mechanical Plastics Corp., is folded for insertion into the pre-drilled hole and pops into or is popped into an expanded holding position.

The very nature of the structures of these hollow wall anchors, which enables them to be inserted and opened by expansion, is also instrumental in their holding limitations. Thus, the hinge portions of a toggle bolt anchor (enabling the anchor to be folded for insertion into the pre-drilled hole) and the soft bendable metal of the molly bolt (with the inserted bolt serving to pull back and expand side legs) are weak points, as is the relatively low shear strength of the flexible plastic of the plastic expansion anchors. These anchors are used for safely holding intermediate loads, generally up to about 100 pounds and then usually only when safely used in groups of anchors.

There is a further class of anchors with higher holding strength designed for use with hollow wall or drywall structures. These include the SNAPTOGGLE® anchor (also from Mechanical Plastics Corp.) with a non-hinged solid metal channel holding element which is turned longitudinally and inserted edgewise and then rotated back to its original axial position, to engage the rear of the wall. These anchors are capable of supporting several hundred pounds in drywall, depending on wall thickness. However, despite such capability there is a need for increasingly greater supporting strength particularly in a shear downward direction especially for non-static high-stress or high-weight holding applications. However, since the holding failure mode with such anchors in drywall is generally that of wall failure, increasing the strength of the anchor alone is of little or no utility.

There are several competing factors which have constrained increasing the support capability of fasteners or anchors such as by increasing size of the anchoring elements. These factors include insertion aperture size, restricted area in the hollow behind the drywall (limiting the size of an anchor that can be placed behind the wall) and the restricted interface area between anchor element and the supporting wall.

The rear of a drywall is essentially directly inaccessible, and it is necessary to place an anchor through a preformed aperture in the drywall for anchoring deployment at the rear or non-accessible side of the wall. This provides a paradoxical situation. Larger anchors are required for greater holding strength, but these larger anchors also require larger insertion apertures. However, in drywall, the formation of larger apertures serves to weaken the wall, thereby negating the effect of using a stronger anchor, which in turn restricts the width and size of the anchor that can be inserted.

In addition to insertion hole restrictions that limit anchor width, the standard 3.75" available depth of the hollow between the drywall and a supporting base wall, also limits the length of the anchor that can be inserted into the aperture. Hinged or flexible anchors of longer length are beset by weakness at the hinge points and the very nature of the flexibility, which militates against holding strength.

The strength of the drywall (i.e., the breakage limit, dependent on drywall thickness), as described, is the most common limiting factor in determining the amount of weight safely supportable by a drywall wall, particularly with the heavy-duty type of anchors. In order to increase the weight supportable by the wall (aside from increasing the thickness of the wall, which is not readily feasible with existing walls) it is necessary to increase the amount of wall area that supports the anchor or fastener, i.e., spreading out of the load, in order to allow the wall itself to support more load. However, existing anchors, such as the molly bolt and toggle bolt anchors, have already been respectively configured to provide their maximum radial expansion for the molly bolt, and a maximum spring loaded and hinged expansion for the toggle bolt anchor. In a variation of the molly bolt anchor, an anchor specifically designed for grab bar use comprises a central rod with a conical skirt of free ended metal legs which are circumferentially compressed for insertion in a predrilled aperture and which circumferentially expand and splay after insertion and setting into engagement with the wall surface. Though the legs of the anchor do not bend in a manner similar to a molly anchor, this anchor requires a large insertion aperture of an inch and a quarter, is quite costly, and has weak hinge section area at its distal end where the legs are permitted to splay. In addition, the anchor cannot splay too far (i.e., beyond an angle of 45°) to avoid eversion of the legs.

SUMMARY OF THE INVENTION

It is accordingly an object of the present invention to provide an economical anchor, suitable for use in supporting very heavy non-static loads on a wall or other substrate and particularly walls made of drywall. It is an object that the anchor requires only a minimally larger insertion hole than existing anchors. It is an object that the anchor expands to significantly increase the direct holding interface, with the supporting substrate such as drywall, compared to prior art anchors.

It is a further object of the present invention to provide the anchor with a holding interface with the wall or substrate which spans across the insertion aperture with a substantially full weight bearing interface, extending in more than one linear direction, passing over the insertion aperture and bearing substantially directly against the substrate surface along its extensions.

It is a still further object of the present invention to provide an anchor having an anchoring element which anchor can be expanded to provide a supporting anchor element in more than two radial directions relative to the anchor insertion hole and wherein the anchor can be fully or partially expanded, depending on proximate location of any expansion-interfering wall stud element.

It is yet another object of the present invention to provide the anchor as a substantially solid element without or with minimal hinges, or weakened flexible sections and wherein the anchor is rotatably expanded behind the supporting drywall wall in a plane parallel to and directly adjacent the wall surface.

It is still yet another object of the present invention to provide a method and anchor for effecting the method wherein the anchor is initially expanded behind a wall or substrate such as drywall with a first expansion with a holding element and then expanded with a second expansion with another holding element, in a different direction relative to the substrate, with load bearing on the substrate being substantially supported by both expansion and holding elements.

Generally the present invention comprises a method of anchoring and an anchor for providing heavy-duty load support on a substrate and particularly on a wall made of drywall. The anchor has an anchoring element configured for supporting heavy and/or dynamic loads, on a substrate or wall having a non-accessible side. The method comprises the steps of:

a) inserting an anchoring element in a minimally sized configuration through an insertion hole in a wall or substrate such as a wall comprised of drywall;

b) expanding the minimally sized configuration of the anchoring element in a first direction relative to the insertion hole;

c) then expanding the anchoring element in a second direction, relative to the first direction, with the first and second directions being separate and crossing each other proximate to the insertion hole; and d) supporting a load, with the anchoring element extending in both the first and second direction, against the substrate.

The anchoring element is configured for insertion into an aperture formed in the substrate or wall for placement of the anchoring element for anchoring support on the non-accessible side. The anchoring element is further configured for assuming a minimal cross section configuration for the insertion, through a minimal sized insertion hole (the diameter of the insertion hole is ideally slightly more than the cross sectional width of the anchoring element), and for being positioned and expanded on the non-accessible side of the wall for load bearing. The anchoring element further comprises an element configured to effect a second expansion of the anchoring element for bearing support against the non-accessible side of the wall. The anchoring element is configured to expand and extend in at least two different expanded directions with members of the anchoring element extending in at least three and preferably four different directions relative to the insertion hole with at least a portion of the anchoring element proximally crossing the insertion hole. It is preferred that the anchoring element is configured with a cooperative element which is engaged by an inserted bolt or screw, during an installation process, to effect a rotational expansion to the second and multidirectional extensions. It is further preferred that portions of the anchoring element intersect across the insertion aperture and extend in equiangular directions relative to each other. For extension, in a preferred configuration in four directions, the angles are right angles. In a preferred embodiment, the anchoring elements are configured to effect at least a portion of the expansion in a rotational direction in a plane parallel to the non-accessible side of the wall and wherein, unless obstructed by a wall stud or other obstacle, the rotational expansion is locked from further movement when the equiangular direction configuration is achieved. The extended multi-directional portions of the anchoring element are each of significant length (preferably approximately 1.5" beyond the periphery of the insertion hole) to provide resistance to shear and tensile pull out. The cross-angular (and 90°) positioning positively ensures a holding vector, resistant to the downwardly directed shear pull out, which is the most common failure mode in drywall.

The above and other objects, features and advantages of the present invention will become more evident from the following discussion and drawings in which:

SHORT DESCRIPTION OF THE DRAWINGS

FIG. 1 is an expanded view of an anchor of the prior art, with positioning elements utilizable with the anchor of the present invention;

FIGS. 2A-D are sequential views of the prior art anchor of FIG. 1 being inserted in an aperture in a wall for supporting an object on the wall and as exemplary of the initial deployment and first expansion of the anchor of the present invention;

Figure 3:
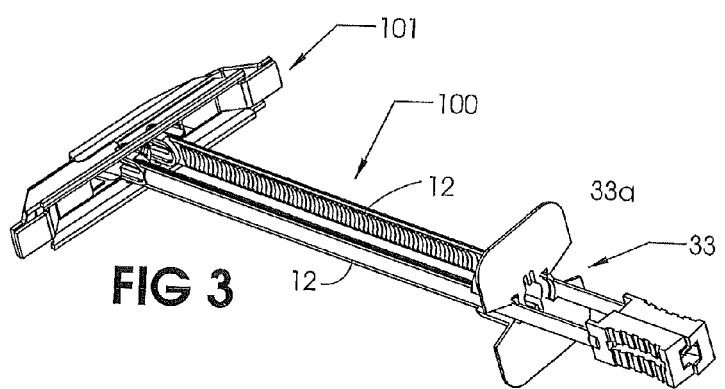
FIG. 3 is a perspective view of an embodiment of the anchor of the present invention, with placement legs, as used with the prior art anchor of FIG. 1.
Figure 5A:
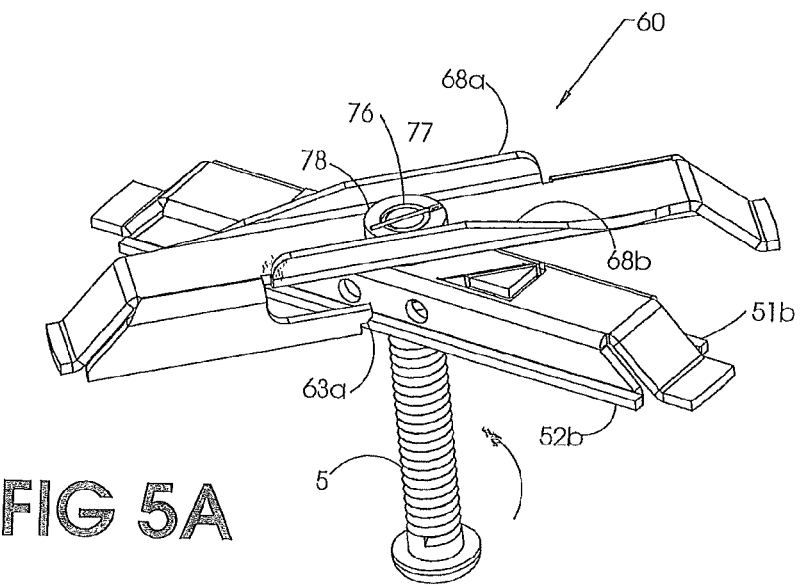
Figure 5B:
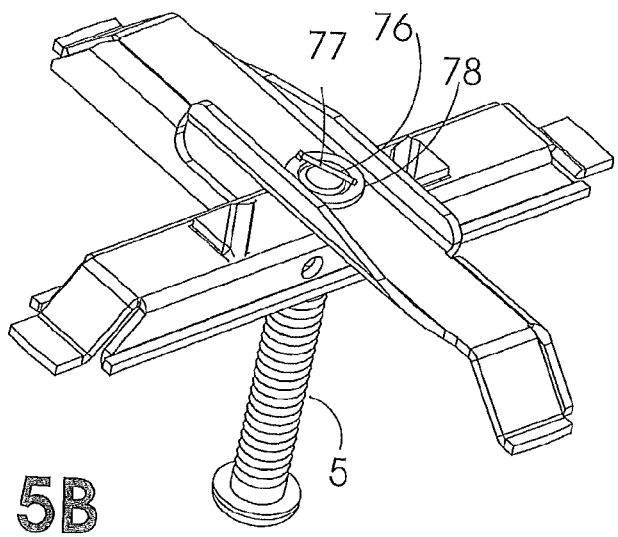
Figure 5C:
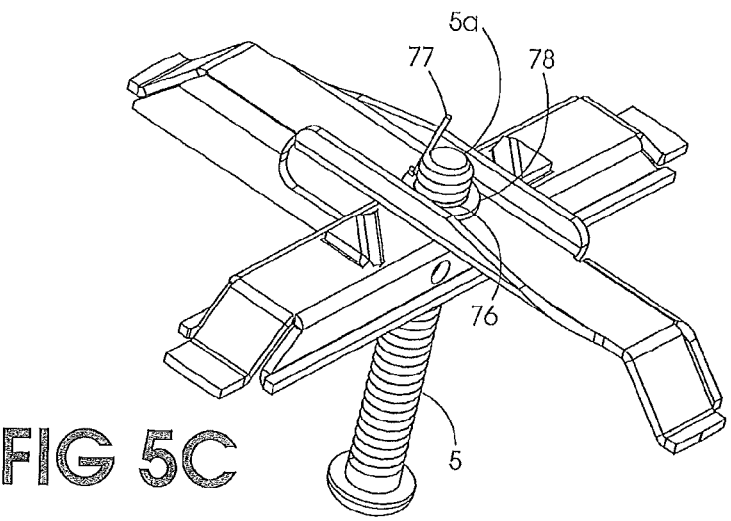
Figure 6:
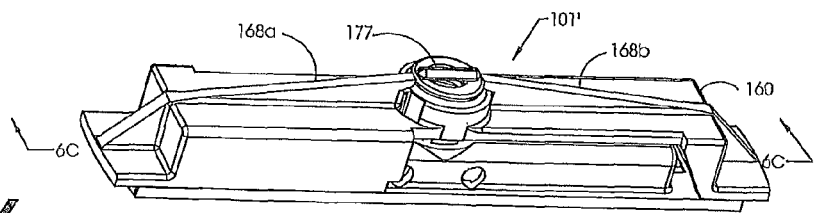
Figure 6A:
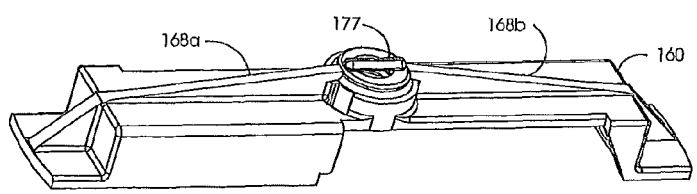
Figure 6B:
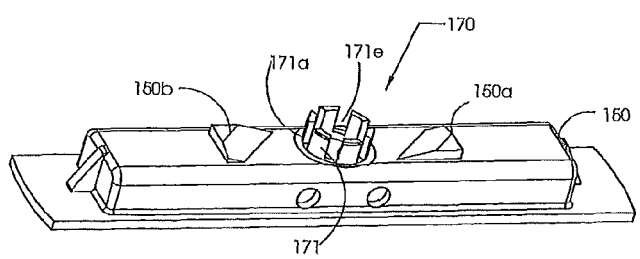
Figure 6C:
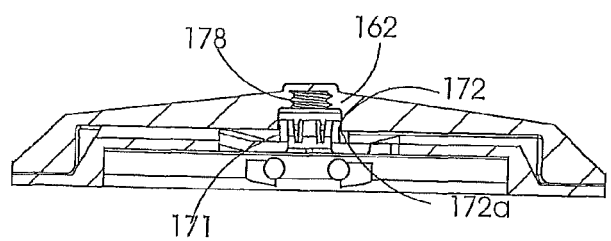

FIGS. 5A-C are sequential different angled views showing the anchoring element portion of the anchor of FIG. 3, as expanded behind the non-accessible side of the wall (not shown), by an inserted load-supporting bolt installation;

FIG. 6 is a perspective view of a reinforced plastic version of the anchoring element of the anchor of FIG. 3;

FIGS. 6A and 6B are perspective views of the top and base channels of the plastic anchor of FIG. 6 respectively, with an integrated connection-pivot element;

FIG. 6C is a cross section view taken along line 6C-6C of FIG. 6

Figure 7:
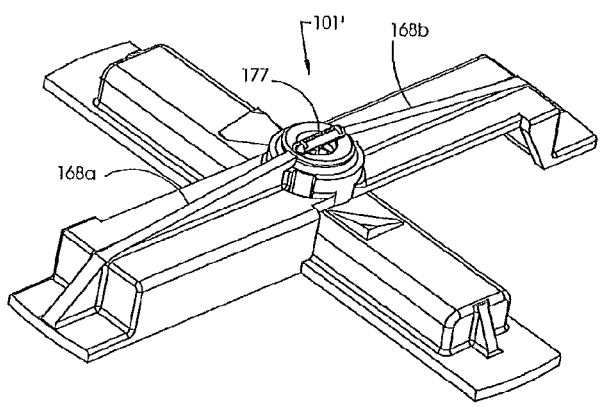
Figure 8A:
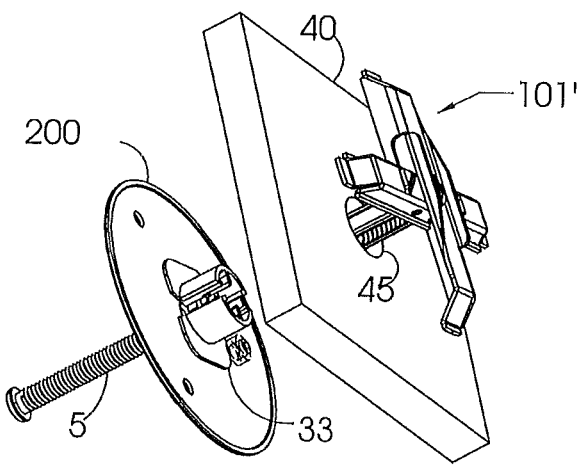
Figure 8B:
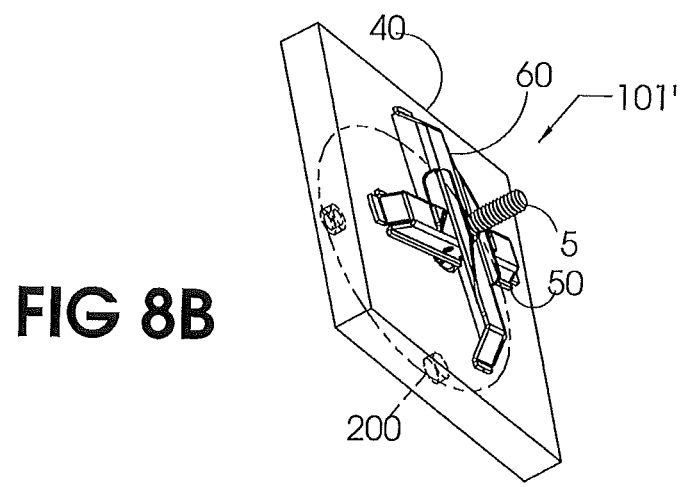

FIG. 7 is a perspective view of the plastic anchor of FIG. 6 in an expanded configuration; and FIGS. 8A and 8B sequentially depict the anchor of FIG. 3 being deployed in a hospital handrail or grab bar supporting application.

DETAILED DESCRIPTION OF THE INVENTION AND DRAWINGS

In a preferred embodiment of the present invention, the anchoring element is comprised of metal as nested channel elements. The nested channel elements provide a structure, suitable for placing it behind a wall comprised of drywall, as a heavy duty load support element, with a minimal placement profile. Respective channel structures of U-shaped cross section, with flat base and perpendicular side skirts, are preferred, since they permit the requisite nesting, as well as having strengthening side skirt members. Prior art structures such as the placement leg members of the SNAPTOGGLE® anchor may be utilized for the initial placement of the nested multiple channel elements behind the wall. It is, however, understood that while the anchor placement mechanism, such as used for the channel of the SNAPTOGGLE® anchor is preferred, because of its positive channel placement, other placement elements may be similarly utilized with the anchoring elements, such as nested channels, of the present invention. Suitable metals are those metals commonly utilized with anchoring channels such as various grades of steel and stainless steel (where corrosion is a possible issue).

The nested metal channel elements, which comprise the anchoring element of the preferred embodiment of the anchor of the present invention, comprise a base channel member, at least one top or upper channel member, and a threaded connecting element integrated with both upper and base channel members. In some embodiments the connecting element is a separable element integrated with the channel members and in others (such as plastic anchoring elements) the connecting element is comprised of elements unitary with either or both of the upper and base channel members.

The connecting element allows the top channel to be moved, preferably by rotational pivoting or swiveling in a plane parallel to the wall, to a different separate extending direction. With such pivoting, at least one of the channel members crosses the insertion hole and bears against opposite surfaces of the non-accessible wall surface, relative to the insertion hole. The other channel member extends at an angle away from the first channel member and also bears against a surface of the non-accessible wall surface. It is preferred that two or more channel members intersect across the insertion hole at right angles to each other and all the channel members bear directly against the wall. In such configuration there are four connected anchor elements extending in different directions around the insertion hole.

A right angle linear intersection between two channel members maximizes and uniformly spreads the holding by the separately linearly extending anchor elements. With additional anchor elements, the intersection angles are preferably those which provide uniform radial distribution of the anchoring elements. In a preferred embodiment, activation of the anchoring element movements or swiveling is effected by the normal procedure involved with utilizing the anchor, e.g., with supporting-bolt insertion into engagement with the threads of the connecting element, rather than with a separate setting step. A separate setting step, such as with a rotational setting tool, while less preferred, is nevertheless still included within the purview of the present invention. It is preferred that a breakaway resistance element, or a frictional resistance element is included in the multiple channel elements. The resistance element is configured to initially interfere with the insertion of the bolt and to initially swivel a channel to a locked expansion position prior to completion of the bolt placement in the channels. In the locked position, the bolt is directed to overcome the resistance and to continue to full bolt seating. The threaded connecting element, in the preferred embodiment, engages the inserted bolt and provides resistance against pull out.

The separate channel elements are configured to permit the unobstructed swiveling movement, while maintaining a residual holding structure, with resistance to deformation caused by a high weight load. In addition, the multiple channel elements are preferably configured such that the swivel or channel movement is effected simultaneously with a drop of the swiveling upper channel member into direct bearing engagement thereof with the non-accessible side of the drywall. Since the upper or top channel member is not in resistive placement against the wall until after being fully swiveled and lowered by a bolt, its movement is substantially unimpeded, in the swivel direction, by frictional drag engagement with the wall surface. Both the bolt insertion rotation and swivel direction are in the standard clockwise threading direction. Elements in the base channel member are configured to elevate the upper channel, when in the nested position, and when the upper channel is swiveled or pivoted, either partially or fully, the elements are configured to permit the upper channel to drop down on the connecting element to effect engagement of the upper channel member with the wall.

A pair of diagonally opposed quadrant ends of the upper or top channel are removed to permit the swiveling in the clockwise direction. In order to compensate for the material removal, the top channel member is preferably reinforced such as with upwardly extending strengthening ribs. The strengthening ribs are however configured and positioned to fit within the curvature of the insertion hole, to maintain a minimal size diameter of the insertion hole.

In order to accommodate the additional thickness of the nested multiple channels, the insertion aperture is minimally widened. Thus, a half inch insertion aperture, required for the SNAPTOGGLE® anchor, is increased to only ¾ inch to accommodate the multiple channel anchor of the present invention, together with reinforcing ribs. This latter aperture size is about the same as that required with the prior art toggle bolt anchors but with much greater holding capacity. In contrast, heavy duty anchors for use with drywall have generally required insertion apertures exceeding an inch in diameter. In a plastic embodiment of the anchor of the present invention it may be necessary to increase anchor wall thicknesses because of the inherent properties of the plastic material. Thus, for such anchors, it may be necessary to utilize insertion holes of ⅞" to 1 inch diameters but not the larger diameters as needed for prior art anchors.

Figure 1:
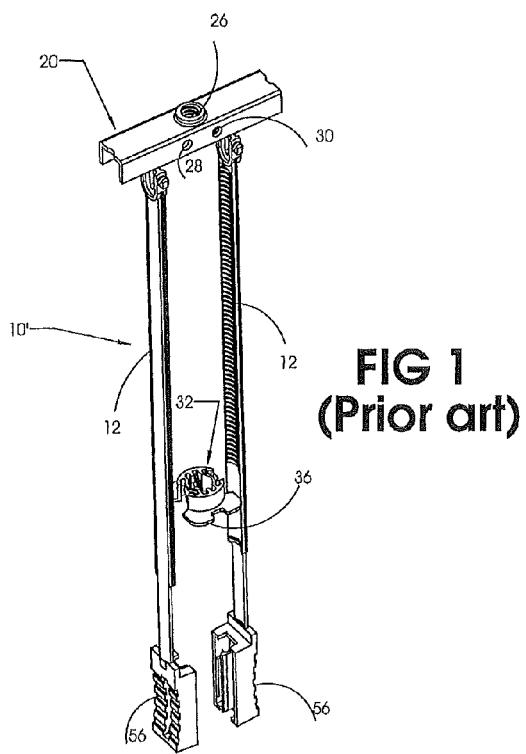
Figure 2A:
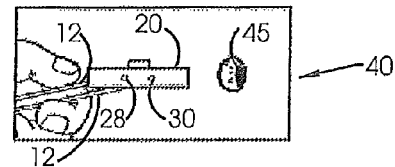

With specific reference to the drawings, as shown in FIG. 1, there are three basic parts to the prior art hollow wall anchor 10, a positioning element, an anchoring element and a wall thickness adjusting element. The positioning element, such as the plastic positioning legs 12, is attached to and serves to carry the metal channel anchoring element 20 through the insertion aperture in a wall. The wall thickness and adjusting element or hat 32, with hole-covering flanges 36, is deployed after placement of the anchoring element to complete the installation of the anchor. FIGS. 2A-D depict how the elements of the prior art anchor 10 are utilized. The positioning legs 12 are slidably attached to each other at manipulating handle sections 56 and pivotally attached to the metal channel 20 at holes 28 and 30. In FIG. 2A the legs 12 are slidably moved to cause the metal channel 20 to pivot and assume a minimal insertion position wherein it become longitudinally extensive with the legs 12 to permit the metal channel 20 to be inserted in minimal diameter wall hole 45 (½" for the commercial anchor shown). After insertion through the hole 45, the legs are realigned in FIG. 2B, with the metal channel 20 reassuming its crosswise holding position against rear wall surface 46 for bearing support. In FIG. 2C, adjusting element or hat 32 is moved along the legs 12 to engagement with the wall 40 adjacent the aperture 45 where it is locked into position to sandwich the wall 40 between the holding channel 20 and flanges 36 of the adjusting element 32. The outwardly extending portions of the leg elements 12 are snapped off and a bolt 5 is guided and inserted through the hat 32 into threaded engagement with threads 26 of metal channel 20 to complete the anchoring positioning of the anchor for holding a shelf 7 as shown in FIG. 2D.

In the embodiment of the anchor 100 of the present invention of FIG. 3, similar positioning legs 12 are utilized as in the prior art (any other similar positioning structure may also be utilized) of FIGS. 1 and 2A-D. The adjusting element or hat 33 is functionally and generally structurally the same but slightly larger, with larger flanges 33a, in order to engage and cover the slightly larger insertion hole required for the anchoring element 101. The anchor 100 of FIG. 3 differs most markedly from the prior art anchors with respect to the load bearing anchoring element 101 and FIGS. 4-8B depict various portions and elements of the load bearing anchoring elements and variations thereof.

Figure 4A:
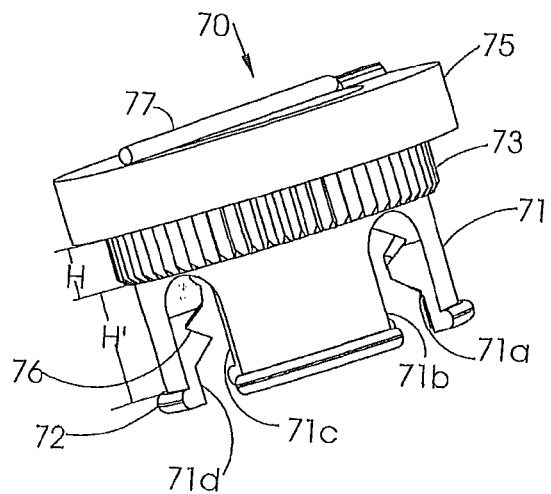
FIGS. 4A, 4b and 4C are perspective views of the components of the anchoring element of the anchor of FIG. 3, showing a connecting pivot element (4A), a top swiveling element (4B), and a base element (4C) respectively.
Figure 4B:
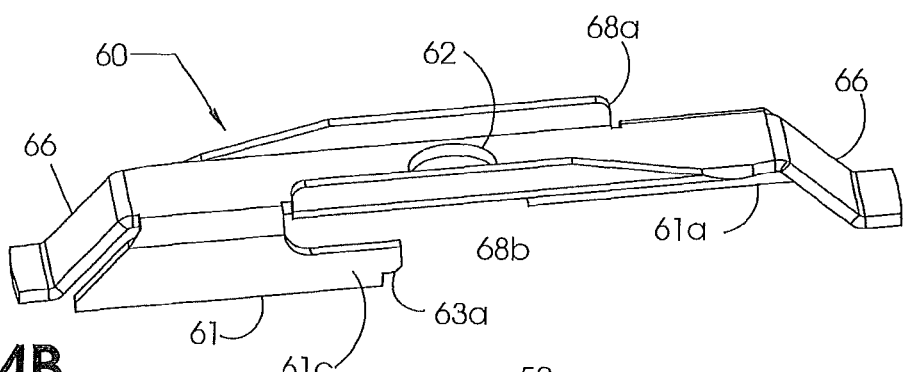
Figure 4C:
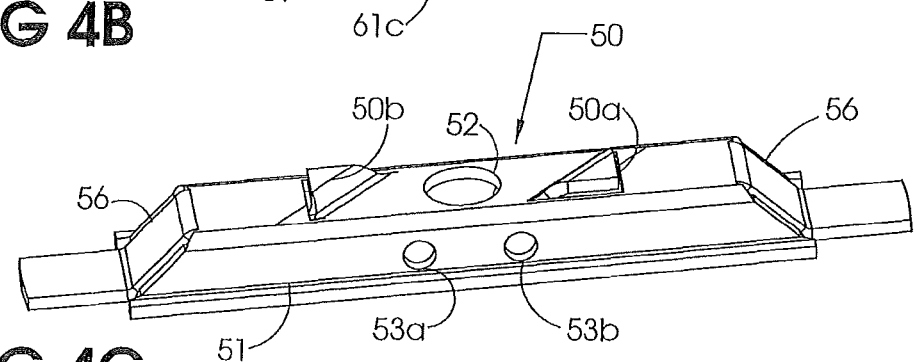

The load bearing anchoring element 101 of FIG. 3 is comprised of structurally reinforced metal and is shown in its component parts in FIGS. 4A, 4B and 4C respectively. The anchoring element is comprised of a base support member 50 which is comparable in basic function to the channel element 20 shown in the prior art anchor 10 of FIG. 1. A secondary top anchoring member 60, is a channel member slightly larger than the base member and it is nested on top of and integrated with the base support member 50, with a swivelable connection, by means of connection-pivoting element 70 (shown relatively larger in FIG. 4A for clarity). Both the top and base members 60 and 50 have side skirts 61 and 51 respectively, as well as end skirts 66 and 56 respectively, which are sized and configured to nest with each other as shown in FIG. 3. Diagonally opposite quadrants 61a and 61b (61b not visible) of the side skirt 61 are removed to enable the top member 60 to rotatably swivel in the clockwise direction shown in FIGS. 5A-C (if a counterclockwise placement is desired, such as dictated by wall stud proximity, removal of the other diagonal quadrants may be alternatively effected). Because of the quadrant removals, the area around the aperture 62 of top member 60 is weakened and may be subject to heavy load bearing folding. Accordingly, as shown in FIGS. 5A-C, small lateral reinforcing ribs 68a and 68b are formed integrally with the top member 60. The base of the remaining quadrants 61c and 61d (61d not visible) are provided with notched sections 63a and 63b (not visible) which are configured and sized to engage the bottom flanges of the skirts 51a and 51b (51b not visible) of the base member when the top member has rotatably swiveled to a 90° position, relative to the base member. The notched sections lock the top member into position in the optimal holding position, preventing further rotation and providing a resistance to enable an inserted bolt to be completely threadingly seated. The non visible portions referred to above are essentially mirror images of the visible portions for symmetry.

In assembly, the connection-pivoting metal element 70 is inserted into the aperture 62 of the metal top anchoring element 60, with upper circumferential thick flange 75 bearing against the periphery of the aperture 62. The toothed section 73 securely engages the walls of the aperture 62 and height H of the toothed section 73 is about equal to the engaged height of the aperture 62, i.e., the thickness of the metal of the top anchoring element 60. The lower portion 71 of the connection-pivoting element 70 is slotted with slots 71a-d to permit a slight compression of the diameter of lower portion 71 to permit the lower portion 71 to fit into the aligned aperture 52 of the base support member 50 past the lip section 72 of connection-pivoting metal element 70. The lip section 72 returns to its original diameter and serves to maintain a connection between the top and base anchoring member elements 60 and 50 during initial anchor element placement and bolt insertion. The height H' of the lower slotted portion 71 is at least twice the thickness of the metal of the base member 50 whereby it provides sufficient room for the top anchoring member 60 to be raised when nested and drawn downwardly when swiveled for expansion. The top member 60 is initially longitudinally aligned with base support member 50 and is spaced upwardly therefrom by elevated segments 50a and 50b in a spaced nested relationship. Elevated segments 50a and 50b are tapered and reduced in height, cooperatively with swiveling of the top member 60 such that the swiveled top member 60, as shown in sequential FIGS. 5A-C, disengages from seating on segments 50a and 50b. As bolt 5 continues to be threadingly inserted into connection-pivoting metal element 70, top member 60 is drawn down around smooth portion 71, toward base member 50, with end and side elements 61a and 61b of top member 60 being brought into direct supportive engagement with wall 40.

Figure 2B:
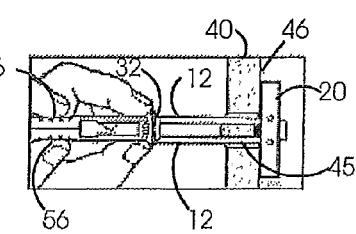
Figure 2C:
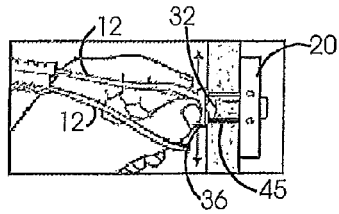
Figure 2D:
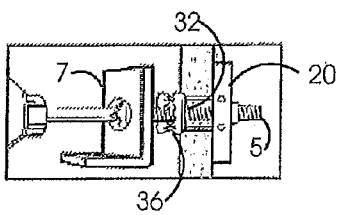

After initial placement of the anchoring element 101 of anchor 100, in the manner of the prior art anchor as shown in FIGS. 2A-B, with expansion of the metal channel anchoring element 20 from the longitudinal insertion position shown in FIG. 2A to the expanded anchoring position in FIG. 2B, hat 33 is moved to lock anchoring element 101 against wall 40 in the manner shown in FIG. 2C. In FIGS. 5A-C, an operative second expansion of the anchoring element 101 is shown in conjunction with threaded insertion of a bolt 5. Resistive element 77, in the form of a small cross bar element, is welded or otherwise attached to one side of the top of the bolt hole 78 of the connection-pivoting metal element 70. The other end of the cross bar element 77 remains unattached. As the bolt end 5a engages resistive element 77, with a frictional engagement, the unrestrained top member 60 with connection-pivoting member 70 is rotated within aperture 52 of the base member 50, in the direction of the bolt threading (clockwise relative to the bolt, as shown). Any resistive element to bolt advancement such as a reamable material within the thread area 76 may similarly suffice to provide sufficient resistance to effect the swiveling expansion of the top member 60 by the bolt. In an alternative embodiment (not shown), a tool may be used to engage the connection-pivoting element and to turn it in the clockwise direction for expansion, as shown with the bolt. As most clearly shown in FIG. 5A, notch 63a and notch 63b (not visible) move toward opposite flanges of the side elements 51a and 51b respectively and when the anchoring elements 50 and 60 assume the optimal right angled configuration in FIGS. 5B and 5C they lock together to prevent further rotational movement of anchoring element 60. With termination of the rotation of anchoring element 60, bolt 5 continues being threaded into threaded area 76 and effects a continued bending of the resistive cross bar element 77 out of the way to complete anchoring deployment.

Anchoring element 101' of FIGS. 6 and 7 is configured from a strong engineering plastic such as polycarbonate, or fiber loaded nylon or other reinforced rigid plastic materials. Plastic anchors are particularly useful in low cost applications and in applications requiring resistance to corrosion where stainless steel is too costly or otherwise inappropriate. The anchoring elements comprise a corresponding top member 160 shown in FIG. 6A and a base member 150 shown in FIG. 6B but wherein the equivalent structural elements of the separate connection-pivoting element of FIG. 4A are cooperatively integrated between the base and top members in forming connector element 170.

The base member 150 comprises a slotted connecting element 171 with an upper lip 172 and with slots 171a-d. As more clearly seen in cross section view FIG. 6C, connecting element 171 is compressible thereby, for insertion into cooperative engagement with a circular recess in top member 160. Lip 172 is engaged therewithin to an undercut in the circular recess to maintain the connection between the top and base members during anchor element insertion into a wall hole and during bolt insertion. The circular recess has walls which correspond in height to the surface 171 of the connecting-pivoting element as in FIG. 4A, to permit connecting element 171 to be accommodated when top member 160 rotates off elevated segments 150a and 150b. Thereafter, the top member 160 is drawn down such as by an inserted bolt (not shown) into the expanded configuration of FIG. 7.

Resistive element 177 engages an inserted bolt as with the metal embodiment shown in FIGS. 5A-5C, however, in the plastic embodiment, the resistive element 177 is a molded fully connected element which is more frangible because of its plastic composition. As an additional feature dictated by the plastic composition, additional strengthening ribs 168a-d are added to the top member. Since the connecting member is integrated with the top member 160 and base member 150, screw or bolt retaining threads 178 are molded into the top member 160 in the upper boss 162 thereof. Alternatively, the top member 160 and boss 162 are configured to be tapped with an inserted self threading screw to provide numerous, e.g. 4 or more, threads, to increase holding strength and retard thread stripping and screw pull-out.

An application of a grab bar installation is shown in FIGS. 8A and 8b with expanded anchor element 101 engaging wall 40 peripheral to insertion hole 45 and grab bar plate 200 is attached via bolt 5. The insertion hole can be as small as ¾" and the anchor extension elements of the top member 60 and base member 50 extend across the hole to a nominal maximum of 3 and ¾ inches in each linear direction for a maximum holding strength in excess of 500 pounds in ⅝" drywall. The anchoring element 101 extends in all directions for maximum shear resistance as well and sandwiches a wall area of about four inch diameter with a four inch diameter grab bar plate 200 (shown also in dotted line in FIG. 8B). Two of such installations are used for the actual attachment of a grab bar.

It is understood that the above Figures and examples are merely illustrative of the present invention and that changes may be made in structure, configuration and component compositions and the like without departing from the scope of the present invention as defined by the following claims.

What is claimed is:

1. An anchor, in combination with a substrate providing support therefor, the substrate comprising an accessible side and a non-accessible side, and the anchor being configured for supporting objects on the accessible side of the substrate, the anchor comprising:

an anchoring element configured for insertion into a minimal sized insertion hole formed in the substrate, for placement of the anchoring element for anchoring support on the non-accessible side of the substrate, the anchoring element comprising:

first and second expansion anchoring elements which are configured for assuming a minimal cross section configuration for insertion through the minimal sized insertion hole and being positioned and expanded on the non-accessible side of the substrate, and a connector-pivoting element configured to closely pivotally connect the first expansion anchoring element to the second expansion anchoring element, to enable the second expansion anchoring elements to be pivotally rotatable via the connector pivoting element only in a plane parallel to the first expansion anchoring element, and wherein the first and second expansion anchoring elements are held only in respective planes substantially parallel with each other, with the first expansion anchoring element being configured to be moved after said insertion to a first expansion position for load bearing in a fixed position against the non-accessible side of the substrate, wherein the second expansion anchoring element is configured to thereafter be moved to a second load bearing expansion position of the anchoring element after the first expansion is fixedly held in the position of bearing support against the non-accessible side of the substrate with the pivotal rotation of the second expansion anchoring element providing the second expansion, and wherein the connector-pivoting element permits the second expansion anchoring element to be rotationally pivoted only in a plane substantially parallel to the first expansion anchoring element, and wherein the first and second expansion anchoring elements of the anchoring element are configured to extend in at least two different expanded directions and in at least three different directions relative to the insertion hole and with at least part of the anchoring element proximally crossing the insertion hole.

2. The anchor with substrate of claim 1, wherein the substrate is drywall.

3. The anchor with substrate of claim 1, wherein the element configured to effect a second expansion is configured to cooperatively interact with a member, separate from the anchoring element, to effect rotational expansion of a part of the anchoring element in a plane parallel to the non-accessible side of the substrate, to provide the second expansion of the anchoring element.

4. The anchor with substrate of claim 3, wherein the anchoring element is configured to assume the rotational expansion with the second expansion of the part of the anchoring element to assume a maximum 90° rotation position and wherein the anchoring element comprises at least one member configured to prevent exceeding the 90° rotation position.

5. The anchor with substrate of claim 1, wherein the anchoring element is configured to extend, with the first and second expansions, in four different directions relative to the insertion.

6. The anchor with substrate of claim 1, wherein the anchoring element is configured to have expanded portions thereof which intersect across the insertion aperture and which expanded portions extend in equiangular directions relative to each other.

7. An anchor, in combination with a substrate providing support therefor, the substrate comprising an accessible side and a non-accessible side, and the anchor being configured for supporting objects on the accessible side of the substrate, the anchor comprising:
an anchoring element configured for insertion into a minimal sized insertion hole formed in the substrate, for placement of the anchoring element for anchoring support on the non-accessible side of the substrate, the anchoring element being configured for assuming a minimal cross section configuration for insertion through the minimal sized insertion hole and for being positioned and expanded on the non-accessible side of the substrate with a first expansion for load bearing in a fixed position against the non-accessible side of the substrate,
wherein the anchoring element comprises an element configured to effect a second expansion of the anchoring element after the first expansion, for bearing support against the non-accessible side of the substrate with the first expansion being in the fixed position, and
wherein the anchoring element is configured to extend in at least two different expanded directions and in at least three different directions relative to the insertion hole and with at least part of the anchoring element proximally crossing the insertion hole, wherein the element configured to effect a second expansion is configured to cooperatively interact with a member, separate from the anchoring element, to effect rotational expansion of a part of the anchoring element in a plane parallel to the non-accessible side of the substrate, to provide the second expansion of the anchoring element,
wherein the member separate from the anchoring element is a bolt configured to be threadingly inserted into the anchoring element and wherein the threading of the bolt results in the cooperative interaction to effect the rotational expansion.

8. An anchor for supporting objects on a substrate, the anchor comprising:
an anchoring element configured for insertion into a minimal sized insertion hole formed in the substrate, for placement of the anchoring element for anchoring support on a non-accessible side of the substrate, the anchoring element comprising:
first and second expansion anchoring elements which are configured for assuming a minimal cross section configuration for insertion through the minimal sized insertion hole and for being positioned and expanded on the non-accessible side of the substrate, and
a connector-pivoting element configured to closely pivotally connect the first expansion anchoring element to the second expansion anchoring element, to enable the second expansion anchoring elements to be pivotally rotatable via the connector pivoting element only in a plane parallel to the first expansion anchoring element, and wherein the first and second expansion anchoring elements are held only in respective planes substantially parallel with each other,
with the first expansion anchoring element being configured to be moved after said insertion to a first expansion position for load bearing in a fixed position against the non-accessible side of the substrate, wherein the second expansion anchoring element is configured to thereafter be moved to a second load bearing expansion position of the anchoring element after the first expansion is fixedly held in the position of bearing support against the non-accessible side of the substrate with the pivotal rotation of the second expansion anchoring element providing the second expansion, and wherein the connector-pivoting element permits the second expansion anchoring element to be rotationally pivoted only in a plane substantially parallel to the first expansion anchoring element, and
wherein the first and second expansion anchoring elements of the anchoring element are configured to extend in at least two different expanded directions and in at least three different directions relative to the insertion hole and with at least part of the anchoring element proximally crossing the insertion hole, wherein the element configured to effect a second expansion is configured to cooperatively interact with a member, separate from the anchoring element, to effect rotational expansion of a part of the anchoring element in a plane parallel to the non-accessible side of the substrate, to provide the second expansion of the anchoring element,
wherein the anchor comprises;
a structure configured to carry the anchoring element in the minimal cross section configuration through the insertion hole and to effect the first expansion,
an adjustable hat member configured to be moved to fixedly position the anchoring element to the non-accessible side of the wall, the anchoring element comprising:
a base channel member, which comprises the first expansion anchoring element,
a top channel member, which comprises the second expansion anchoring element, and
wherein the connector-pivoting element is configured to pivotally connect the top channel member to the base channel member, the top channel member is configured to be nested with the base channel member in the minimal cross section configuration and to be pivotally rotatable via the connector pivoting element only in the plane parallel to the non-accessible side of the wall, with the pivotal rotation of the top channel member providing the second expansion.

9. The anchor of claim 8, wherein the member separate from the anchoring element is a bolt configured to be threadingly inserted into the anchoring element and wherein the threading of the bolt is in the clockwise direction relative to the front of the wall.

10. The anchor of claim 8, wherein the anchoring element comprises elements to maintain the top channel member spaced from the non-accessible side of the substrate prior to the pivotal rotation and which permit the top channel member to engage and be fixedly positioned against the non-accessible side of the substrate with such pivotal rotation, whereby the top channel member is configured to provide load bearing separate from the base channel member.

11. An anchor for supporting objects on a substrate, the anchor comprising:
an anchoring element configured for insertion into a minimal sized insertion hole formed in the substrate, for placement of the anchoring element for anchoring support on a non-accessible side of the substrate, the anchoring element being configured for assuming a minimal cross section configuration for insertion through the minimal sized insertion hole and for being positioned and expanded on the non-accessible side of the substrate with a first expansion for load bearing in a fixed position against the non-accessible side of the substrate, wherein the anchoring element comprises an element configured to effect a second expansion of the anchoring element after the first expansion, for bearing support against the non-accessible side of the substrate with the first expansion being in the fixed position, and wherein the anchoring element is configured to extend in at least two different expanded directions and in at least three different directions relative to the insertion hole and with at least part of the anchoring element proximally crossing the insertion hole, wherein the element configured to effect a second expansion is configured to cooperatively interact with a member, separate from the anchoring element, to effect rotational expansion of a part of the anchoring element in a plane parallel to the non-accessible side of the substrate, to provide the second expansion of the anchoring element wherein the anchor comprises;

a structure configured to carry the anchoring element in the minimal cross section configuration through the insertion hole and to effect the first expansion, an adjustable hat member configured to be moved to fixedly position the anchoring element to the non-accessible side of the wall, the anchoring element comprising:

a base channel member, a top channel member, and a connector-pivoting element configured to pivotally connect the top channel member to the base channel member, the top channel member configured to be nested with the base channel member in the minimal cross section configuration and to be pivotally rotatable via the connector pivoting element in the plane parallel to the non-accessible side of the wall, with the pivotal rotation of the top channel member providing the second expansion, wherein the top channel member comprises a channel configured with a U shaped cross section comprised of a base and side skirt sections wherein a pair of diagonally opposed quadrant end sections of the side skirt sections are removed to permit the pivotal rotation from the nesting position of the top channel member on top of the base channel member.

12. The anchor of claim 11 wherein the top channel member is provided with at least one reinforcing rib element to strengthen the top channel member with removed opposite diagonal quadrants.

13. The anchor of claim 11, wherein the pair of removed diagonally opposite quadrant end sections is a pair which permits clockwise rotation of the top channel member relative to a front of the substrate.

14. An anchor for supporting objects on a substrate, the anchor comprising:

an anchoring element configured for insertion into a minimal sized insertion hole formed in the substrate, for placement of the anchoring element for anchoring support on a non-accessible side of the substrate, the anchoring element being configured for assuming a minimal cross section configuration for insertion through the minimal sized insertion hole and for being positioned and expanded on the non-accessible side of the substrate with a first expansion for load bearing, wherein the anchoring element comprises an element configured to effect a second expansion of the anchoring element after the first expansion, for bearing support against the non-accessible side of the substrate, wherein the element configured to effect a second expansion is configured to cooperatively interact with a member, separate from the anchoring element, to effect rotational expansion of a part of the anchoring element in a plane parallel to the non-accessible side of the substrate, to provide the second expansion of the anchoring element, wherein the anchor comprises;

a structure configured to carry the anchoring element in the minimal cross section configuration through the insertion hole and to effect the first expansion, an adjustable hat member configured to be moved to fixedly position the anchoring element to the non-accessible side of the wall, the anchoring element comprising:

a base channel member, a top channel member, and a connector-pivoting element configured to pivotally connect the top channel member to the base channel member, the top channel member configured to be nested with the base channel member in the minimal cross section configuration and to be pivotally rotatable via the connector pivoting element in the plane parallel to the non-accessible side of the wall, with the pivotal rotation of the top channel member providing the second expansion, wherein the member separate from the anchoring element is a bolt configured to be threadingly inserted into the anchoring element and wherein the threading of the bolt is in the clockwise direction relative to the front of the wall, wherein the connector-pivoting element comprises threads for the threading of the bolt therein and wherein the connector-pivoting element comprises a resistive element configured to engage the bolt upon threaded insertion of the bolt whereby the top channel member is rotated and wherein the resistive element is configured to give way from further bolt threading resistance after the top channel member is rotated to a stop.

15. The anchor of claim 14, wherein the top and base channel members are comprised of metal and the connector-pivoting element is a metal element separate from the top and base channel members.

16. The anchor of claim 14, wherein the top and base channel members are comprised of plastic and the connector-pivoting element is comprised of plastic as an integral part of the top and base channel members.

17. The anchor of claim 16, wherein the top channel is configured to be tapped by a self tapping screw.

* * * * *